United States Patent [19]

Neil

[11] Patent Number: 4,479,695
[45] Date of Patent: Oct. 30, 1984

[54] AFOCAL REFRACTOR TELESCOPES

[75] Inventor: Iain A. Neil, Glasgow, Scotland

[73] Assignee: Barr & Stroud Limited, Glasgow, Scotland

[21] Appl. No.: 299,200

[22] Filed: Sep. 3, 1981

[30] Foreign Application Priority Data

Oct. 8, 1980 [GB] United Kingdom ............... 8032397

[51] Int. Cl.³ .................... G02B 3/00; G02B 15/02
[52] U.S. Cl. .................... 350/1.3; 350/432; 350/453; 350/481; 350/559
[58] Field of Search ................ 350/1.1–1.3, 350/559, 453, 432, 481

[56] References Cited

U.S. PATENT DOCUMENTS 4,397,520 8/1983 Neil .................. 350/1.2

*Primary Examiner*—Bruce Y. Arnold
*Attorney, Agent, or Firm*—Mason, Fenwick & Lawrence

[57] ABSTRACT

An afocal refractor telescope is formed by a fixed focus achromatic telephoto objective system (10) and a fixed focus eyepiece system (11) aligned on a common optical axis (12) and is arranged to provide an internal real image (13). The objective system (10) is formed by a primary lens element (D) and a secondary lens element (C) and the eyepiece system (11) has at least two lens elements (A, B). Each of the lens elements (A,B,C,D) of the telescope is made of a material having a useful spectral bandpass in the infrared wavelength region and has refractive surfaces (1,2,3,4,5,6,7,8) intercepting the optical axis (12), at least one of the refractive surfaces (7,8) of the primary objective lens element (D) being aspheric whereas the refractive surfaces (1,2,3,4,5,6) of the lens elements (A,B,C) are substantially spherical. The aspheric surface (7,8) possesses only a small degree of asphericity and is defined by an equation in which the third and higher order aspheric coefficients are zero. The secondary objective lens element (C) is negatively powered and has a refractive index equal to or lower than the refractive index of the primary objective lens element (D) which is positively powered and the arrangement is such that the telescope has an internal f-number in the airspace between the primary and secondary objective lens elements (D,C) which is less than 1.5.

8 Claims, 4 Drawing Figures

AFOCAL REFRACTOR TELESCOPES

This invention relates to afocal refractor telescopes.

The arrival of high performance forward looking infrared systems (commonly known by the acronym FLIR) has led to a demand for high performance afocal telescopes suitable for use with the FLIR system. Various forms of such telescopes have been previously proposed, some of which are reasonably compact but the practical requirement for extreme compactness (i.e. very short overall length) has imposed a requirement for low pupil aberrations which has proved difficult to achieve without considerable optical and mechanical complexity in a refractor system. Catadioptric telescope systems with the required degree of compactness have been designated but these tend to be complex and additionally suffer from a central obscuration which is disadvantageous.

According to the present invention there is provided an afocal refractor telescope formed by a fixed focus achromatic telephoto objective system and a fixed focus eyepiece system aligned on a common optical axis and arranged to provide an internal real image, said objective system being formed by a primary lens element and a secondary lens element and said eyepiece system being formed by at least two lens elements, each of the lens elements of the telescope being made of a material having a useful spectral bandpass in the infrared wavelength region and having refractive surfaces intercepting said optical axis, at least one of the refractive surfaces of said primary objective lens element being aspheric and each of the refractive surfaces of the other lens elements of the telescope being substantially spherical, the aspheric surface possessing only a small degree of asphericity, the secondary objective lens element being negatively powered and having a refractive index equal to or lower than the refractive index of the primary objective lens element which is positively powered, the telescope having an internal f-number in the airspace between the primary and secondary objective lens elements of less than 1.5.

Because the telescope of the present invention is of the refractor type there is no obscuration of the aperture; and with all but one of the lens elements having refractive surfaces which are substantially spherical, the non-spherical surface or surfaces possessing an aspheric profile which exhibits only a small departure from a spherical profile, the lens elements are easy to manufacture.

The objective system may be colour corrected by making the dispersive V value of the secondary objective lens element less than that of the primary objective lens element and the telescope can be made extremely compact with a performance near the diffraction limit over a wide range of magnifications by making the refractive index of the secondary objective lens element less than that of the primary objective lens element.

The colour correcting lens element of the objective system may be a chalcogenide glass such as that sold by Barr and Stroud Limited under their designation 'Type 1 Chalcogenide Glass', whereas each of the other lens elements of the telescope may be made of germanium, all of which materials have a useful spectral bandpass somewhere in the 3–13 micron infrared wavelength region. Alternatively, the color correcting lens element may be made from any other optical material which exhibits suitable physical characteristics. Table IV recites some of the most suitable optical materials.

The colour correcting lens element may be fixedly mounted with respect to the other lens elements but conveniently it is movable along the optical axis as a result of which the telescope can be compensated for changes in ambient temperature which produce shifts in position of the real image formed within the telescope. Also, such movement of the colour correcting lens element can be utilised to vary the focus of the telescope (without departing from its so-called 'afocal' nature) provided that the real image formed within the telescope need not be of high quality. This is conveniently achieved when the colour-correcting lens element is of low optical power since minimal magnification change is produced when this element is moved.

Alternatively the telescope can be compensated for changes in ambient temperature by constructing the surrounding framework of the lens system using materials of which two have substantially different thermal expansion coefficients (i.e. passive mechanical athermalisation). The colour correcting lens element may be movable along the optical axis or it can be fixedly mounted with respect to the other lens elements at a position which provides the telescope with a fixed focus, typically the hyperfocal focus.

Embodiments of the present invention will now be described by way of example with reference to the accompanying schematic drawings and tables.

Figure 1:
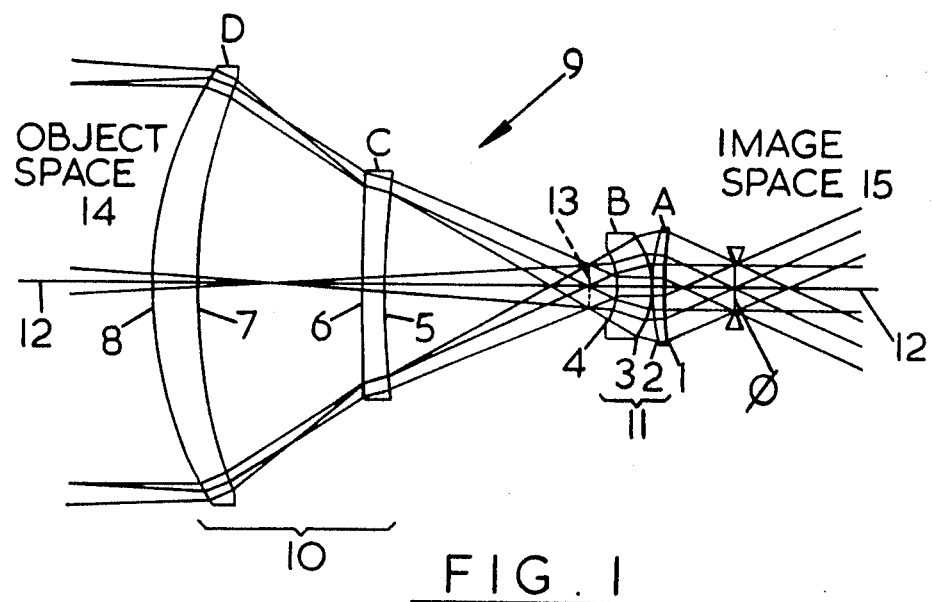
FIG. 1 illustrates an afocal refractor telescope having a first lens system embodying the present invention.

As is shown in FIG. 1 a telescope 9 is formed by an objective system 10 and an eyepiece system 11 aligned on a common optical axis 12. The telescope 9 is of the afocal refractor type and internally forms a real image 13 of radiation entering the telescope from object space 14. The objective system 10 is telephoto and formed by a primary lens element D and a secondary lens element C, the latter being negatively powered (i.e. divergent) and colour corrective whereas the former is positively powered (i.e. convergent). Element C has refractive surfaces 5, 6 and element D has refractive surfaces 7, 8. The eyepiece system 11 is formed by positively powered lens elements A, B with respective refractive surfaces 1, 2 and 3, 4. Elements A and B together form a fixed focus system and elements C and D also form a fixed focus system so that the objective system 10 accepts a bundle of parallel rays from an entrance pupil formed in the object space 14 and the eyepiece system 11 collects radiation from the inverted real image 13 formed by the objective system 10 and produces a bundle of parallel rays which form an exit pupil $\phi$ in image space 15. The optical power of and the spacing between the various lens elements A, B, C, D is arranged such that the image 13 lies between refractive surfaces 5 and 3.

The refractive surfaces 1, 2, 3, 4, 5, 6 and 8 are each substantially spherical, i.e. if they are not truly spherical they are 'spherical' within the meaning of the art, whereas surface 7 in having an aspheric profile is non-spherical.

The telescope 9 is designed for use in the infrared wavelength region (i.e. 3–13 microns) and consequently the refractive indices of the lens elements are relatively large but in order to provide sufficiently high optical performance lens element C is colour corrective, negatively powered and has a lower refractive index than element D. This is achieved for the 8–13 micron range by making lens elements A, B and D of germanium, the refractive index of which is 4.00322, and lens element C of Barr and Stroud Type 1 chalcogenide glass, the refractive index of which is 2.49158, measured at a wavelength of 10 microns and at a temperature of 20° C. In this case element C has a dispersive capacity, or V-value, of 152 where the V-value is defined as the ratio of the refractive index at 10 microns minus 1 to the refractive index at 8.5 microns minus the refractive index at 11.5 microns. These materials which are suited to being anti-reflection coated, when anti-reflection coated provide a telescope with at least 65% transmission of incident radiation in the 8.5 to 11.5 micron range.

The lens element C is preferably movable along the optical axis 12 whereas the other lens elements A, B and D are not and this permits compensation of the telescope against movements of the image 13 induced by ambient temperature changes typically within the range −10° C. to +50° C. Alternatively, for a fixed position of the image 13 the telescope can be focussed on distant objects, typically within the range 50 meters to infinity.

Alternatively lens element C and the other lens elements A, B and D can be fixedly mounted. By suitably constructing the surrounding framework which supports lens element D using a material or materials which afford high thermal expansion coefficients such as an ultra high molecular weight polyethylene (commonly known by the acronym 'UHMPE') and by constructing much of the remaining telescope framework using a material or materials which afford relatively low thermal expansion coefficients such as aluminum (thermal expansion coefficient of aluminum$\simeq 23\times 10^{-6}$, UHMPE$\simeq 125$–$225\times 10^{-6}$) it is possible to compensate the telescope for ambient temperature changes over the range −40° C. to +70° C. while simultaneously maintaining constant focus and good optical performance. Although this only provides the telescope with a single fixed focus it eliminates the need for any movement of lens element C and hence the active mechanics which move lens element C.

One example of the telescope 9 is detailed in Table I wherein the radius of curvature of each refractive surface is given together with the aperture diameter of each surface and of the pupil $\phi$, the position of which is used as a datum from which the separation of successive refractive surfaces is defined, together with the nature of the material relevant to such separation interval. Thus, for example, surface 5 has a radius of curvature of −300.77 millimeters, the −ve sign indicating that the centre of curvature is to the right hand side of surface 5; it is separated by an airspace of 82.32 millimeters from the preceding surface, No. 4, in the direction of the pupil $\phi$; it has an aperture diameter of 72.09 millimeters; and is separated from the succeeding surface, No. 6, by a distance 7.5 millimeters in a Barr & Stroud Type 1 chalcogenide glass.

Figure 2:
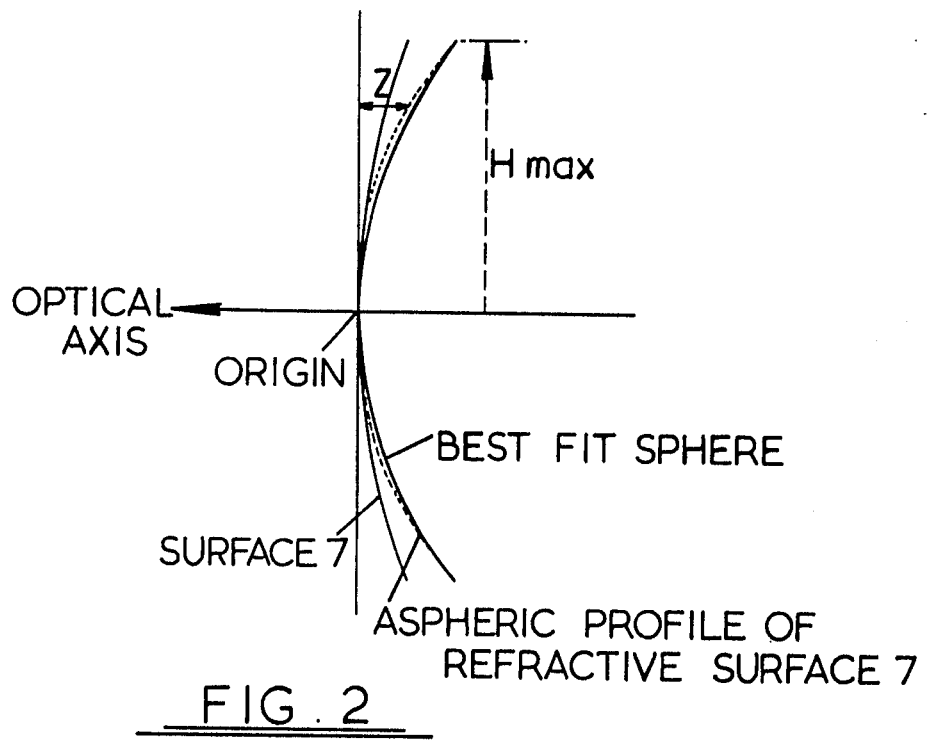
FIG. 2 is an aspheric profile diagram of the aspheric surface of the objective system secondary lens element.

The aspheric profile of refractive surface 7 is shown in FIG. 2 where; the separations Z parallel to the optical axis between both the aspheric profile and the best fit sphere and the datum spherical surface 7' are scaled by a factor of 750; the aspheric profile is governed by the following equation:

$$ZC = +1 - \sqrt{1 - C(CH^2 + BH^4 + GH^6 + \ldots)} \quad (1)$$

where,
Z = distance along optical axis.
C = 1/R; R = radius of curvature of surface 7' (= −204.98 mm).
H = radial distance perpendicular to optical axis (maximum value = 70.69 mm).
B = first order aspheric coefficient (= −2.54×10$^{-9}$).
G = second order aspheric coefficient (= +2.45×10$^{-13}$).
... = higher order terms (= 0.0).

and the best fir sphere is the spherical surface from which the aspheric profile makes only a small departure. Table III contains calculated values of separation between the aspheric profile and the best fir sphere for different aperture heights, and the radius of curvature of the best fit sphere.

This telescope produces a magnification of ×9.0 and has an internal f-number of 0.92 in the airspace between lens elements C and D. Colour correction is maintained over the 8.5 to 11.5 micron range and with element C movable, focussing and thermal compensation is available over the ranges 50 meters to infinity and −10° C. to +50° C. respectively. For practical purposes, if the performance degradation is acceptable, the range for focus and thermal compensation can be increased to 5 meters to infinity and −40° C. to 70° C. Alternatively lens element C and lens elements A,B and D can all be fixedly mounted thus providing a single fixed focus with thermal compensation achieved by passive means and being available over the range −40° C. to 70° C. with minimal degradation in overall performance. Specific values of image quality for this telescope when it is focussed at a distance of approximately 700 meters are given in Table II.

The telescope which has been described provides high performance over at least two-thirds of the full field with a primary objective aperture diameter enlarged by less than 8.1% to accommodate pupil aberrrations and the angular distortion at the maximum field angle is only about +1.4%, the +ve sign indicating increasing magnification with increasing field angle. Also, this is achieved for a telescope which has no vignetting at any of the refractive surfaces of the lens elements, introduces no noticeable narcissus effect and which is of a short overall length.

Although only two aspheric coefficients have been used to provide the lens solution given more (i.e. high order) aspheric coefficients can be used if so wished. It is also possible to optimise this telescope in such a way that it can provide a different field of view and pupil diameter in image space thus making the telescope suitable for attachment to different detector systems which may or may not use scanning mechanisms.

The telescope detailed in Tables I–III inclusive can be scaled and optimised to provide a wide range of magnifications with the general lens configuration remaining constant. In addition, the eyepiece system lens element, proximal the pupil in image space, i.e. element A, can be replaced by two or more lens elements. This provides a small improvement in overall optical performance and gives the eyepiece system an improved overall aberration balance.

Figure 3:
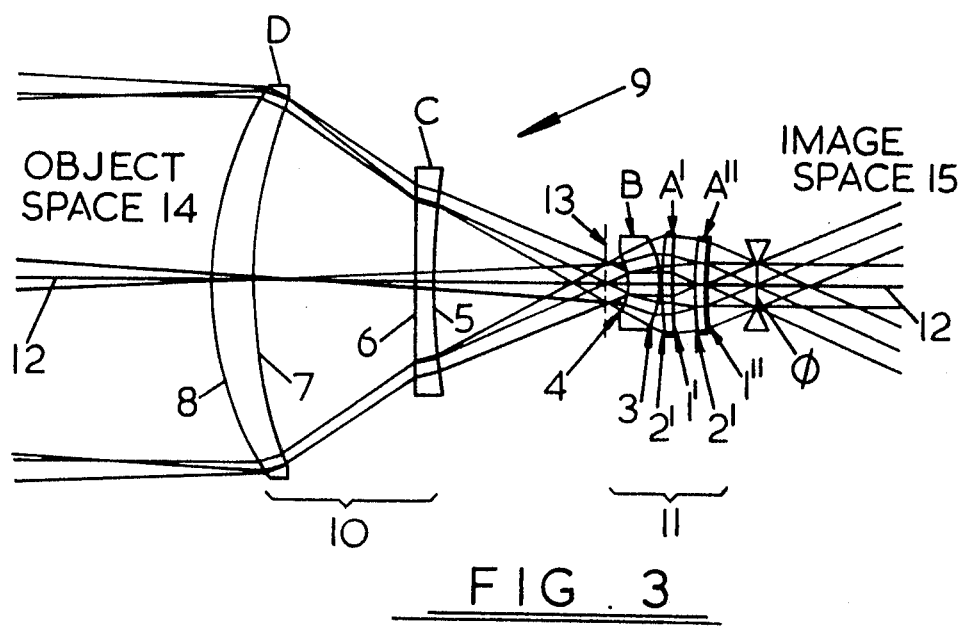
FIG. 3 illustrates an afocal refractor telescope incorporating a second lens system according to the present invention.
Figure 4:
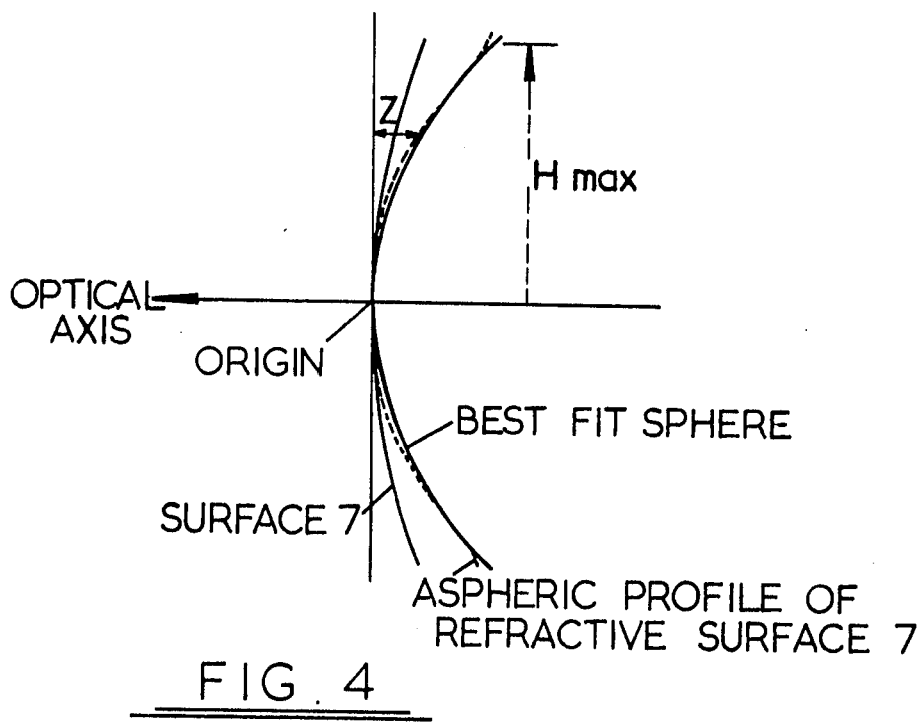
FIG. 4 is an aspheric profile diagram of the aspheric surface of the objective system secondary lens element of FIG. 3.

FIG. 3 illustrates the arrangement where lens element A of FIG. 1 has been replaced by two lens elements A' and A" having respective refractive surfaces 1', 2' and 1" each of which is spherical. The remaining lens elements retain their general FIG. 1 configuration and specific values of curvature and spacing are given in Table V, performance figures in Table VI with details of the aspheric profile 7 in Table VII and illustrated in FIG. 4 with separations parallel to the optic axis enlarged by a factor of 2000 in the interests of clarity. Aspheric surface 7 in this case is provided by the previously described equation using $R = -193.38$ mm, H in the range 0 to 68.954 mm, $B = -2.07 \times 10^-$, $G = +2.93 \times 10^{-13}$ and all higher order coefficients zero. The f-number of this telescope in the air space between elements D and C is 0.89 and it will be noted that the performance figures given in Table VII show an improvement over those of Table II.

Although the embodiments described only refractive surface 7 as being aspheric it will be appreciated that the same performance could be achieved by making only surface 8 aspheric or by making both surfaces 7 and 8 aspheric, this latter arrangement having the advantage that the total degree of asphericity will be apportioned between the two surfaces so that each will then have a much reduced degree of asphericity in comparison with that of surface 7 as detailed in Table III or tables VI.

It will also be appreciated that without altering the general lens configuration the telescopes described can be scaled to give any desired magnification within the range 0.5 to 35 and the field of view and image space pupil $\phi$ can be independently enlarged or reduced in size. It is to be noted that the f-number specified herein is derived from the formula $(2. \sin\theta)^{-1}$ where $\theta$ is the half angle of the cone formed by the axial field pencil after refraction from the lens element on which the pencil is incident.

The data in tables I–VII inclusive is for 20° C.

TABLE I

| Lens | Surface | Separation | Radius of Curvature | Material | Aperture Diameter |
|---|---|---|---|---|---|
| Entrance Pupil* | ∅ | 0 | Flat | Air | 15.30 |
| A | 1 | 25.34 | −199.20 | Air | 37.61 |
|   | 2 | 4.25 | −66.25 | Ge | 38.41 |
| B | 3 | 0.50 | 29.36 | Air | 34.42 |
|   | 4 | 11.94 | 22.88 | Ge | 23.29 |
| C | 5 | 82.32 | −300.77 | Air | 72.09 |
|   | 6 | 7.50 | −1799.70 | As/Se/Ge(BS1) | 76.40 |
| D | 7# | 59.07 | −204.98 | Air | 141.37 |
|   | 8 | 15.71 | −141.40 | Ge | 148.11 |

*Maximum field angle at entrance pupil = 46.4°.
Surface 7 has an aspheric profile.

TABLE II

| | Approximate R.M.S. Spot Sizes in Object Space (in milliradians) | |
|---|---|---|
| Field | Monochromatic at 10.0 microns | *Chromatic over 8.5–11.5 microns |
| Axial | 0.053 | 0.081 |
| ½ | 0.071 | 0.105 |
| ¾ | 0.073 | 0.113 |
| Full | 0.101 | 0.145 |

*Given as an equally weighted three wavelength accumulated measurement, the wavelengths being 8.5, 10.0 and 11.5 microns.

TABLE III

| Radial Distance Perpendicular to Optical Axis (mm) | Depth# of Aspheric Profile (microns) |
|---|---|
| 0.00 | 0.00 |
| 2.83 | −0.03 |
| 5.65 | −0.10 |
| 8.48 | −0.22 |
| 11.31 | −0.39 |
| 14.14 | −0.59 |
| 16.96 | −0.82 |
| 19.79 | −1.07 |
| 22.62 | −1.33 |
| 25.45 | −1.58 |
| 28.27 | −1.83 |
| 31.10 | −2.05 |
| 33.93 | −2.23 |
| 36.76 | −2.36 |
| 39.58 | −2.44 |
| 42.41 | −2.45 |
| 45.24 | −2.39 |
| 48.06 | −2.26 |
| 50.89 | −2.06 |
| 53.72 | −1.79 |
| 56.55 | −1.47 |
| 59.37 | −1.11 |
| 62.20 | −0.75 |
| 65.03 | −0.41 |
| 67.86 | −0.14 |
| 70.68 | 0.00 |

Radius of curvature of the best fit sphere = −204.7094 mm

Depth of aspheric profile is defined as the separation distance between points, of equal radial perpendicular to the optical axis, on the aspheric profile and best fit sphere.

The −ve sign signifies the removal of lens element material from the best fit sphere to obtain the aspheric profile.

TABLE IV

| Material | Refractive index* | V-value# |
|---|---|---|
| BS2 | 2.85632 | 248 |
| BSA | 2.77917 | 209 |
| TI 1173 | 2.60010 | 142 |
| AMTIR | 2.49745 | 169 |
| BS1 | 2.49158 | 152 |
| TI 20 | 2.49126 | 144 |
| ZnSe | 2.40653 | 77 |
| KRS 5 | 2.37044 | 260 |
| CsI | 1.73933 | 316 |
| CsBr | 1.66251 | 176 |
| KI | 1.62023 | 137 |

*The refractive index is for 10 microns.
Over the wavelength range 8.5–11.5 microns.

TABLE V

| Lens | Surface | Separation | Radius of Curvature | Material | Aperture Diameter |
|---|---|---|---|---|---|
| Entrance Pupil* | ∅ | 0 | Flat | Air | 15.30 |
| A" | 1" | 19.52 | −199.20 | Air | 32.80 |
|   | 2" | 4.18 | −100.08 | Ge | 33.92 |
| A' | 1' | 8.50 | −476.45 | Air | 36.54 |
|   | 2' | 3.75 | −110.89 | Ge | 36.87 |
| B | 3 | 0.50 | 30.79 | Air | 33.16 |
|   | 4 | 12.77 | 23.01 | Ge | 21.71 |
| C | 5 | 74.06 | −286.13 | Air | 66.69 |
|   | 6 | 7.50 | −7621.95 | As/Se/Ge(BS1) | 70.97 |
| D | 7# | 61.95 | −193.98 | Air | 137.91 |
|   | 8 | 15.71 | −135.64 | Ge | 144.82 |

*Maximum field angle at entrance pupil = 46.4°.
As required by this magnification mode.
Surface 7 has an aspheric profile.

TABLE VI

Approximate R.M.S. Spot Sizes in Object Space (in milliradians).

| Field | Monochromatic at 10.0 microns | *Chromatic over 8.5-11.5 microns |
|---|---|---|
| Axial | 0.040 | 0.075 |
| ⅓ | 0.044 | 0.093 |
| ⅔ | 0.052 | 0.108 |
| Full | 0.089 | 0.140 |

*Given as an equally weighted three wavelength accumulated measurement, the wavelengths being 8.5, 10.0 and 11.5 microns.

TABLE VII

| Radial Distance Perpendicular to Optical Axis (mm) | Depth# of Aspheric Profile (microns) |
|---|---|
| 0.00 | 0.00 |
| 2.76 | −0.01 |
| 5.52 | −0.05 |
| 8.27 | −0.12 |
| 11.03 | −0.20 |
| 13.79 | −0.31 |
| 16.55 | −0.42 |
| 19.31 | −0.54 |
| 22.07 | −0.65 |
| 24.82 | −0.76 |
| 27.58 | −0.85 |
| 30.34 | −0.91 |
| 33.10 | −0.95 |
| 35.86 | −0.95 |
| 38.61 | −0.91 |
| 41.37 | −0.83 |
| 44.13 | −0.72 |
| 46.89 | −0.58 |
| 49.65 | −0.42 |
| 52.41 | −0.27 |
| 55.16 | −0.13 |
| 57.92 | −0.05 |
| 60.68 | −0.07 |
| 63.44 | −0.24 |
| 66.20 | −0.61 |
| 68.95 | −1.26 |

Radius of curvature of the best fit sphere = −193.84 mm

Depth of aspheric profile is defined as the separation distance between points, of equal radial distance perpendicular to the optical axis, on the aspheric profile and best fit sphere.

The negative sign signifies the removal of lens element material from the best fit sphere to obtain the aspheric profile.

What is claimed is:

1. An afocal refractor telescope formed by an achromatic telephoto objective system and a fixed focus eyepiece system aligned on a common optical axis and arranged to provide an internal real image, said objective system being formed by a primary lens element and a secondary lens element and said eyepiece being formed by at least two lens elements, each of the lens elements of the telescope being made of a material having a useful spectral bandpass in the infrared wavelength region and having refractive surfaces intercepting said optical axis, at least one of the refractive surfaces of said primary objective lens elements being aspheric and each of the refractive surfaces of the other lens elements of the telescope being substantially spherical, the aspheric surface possessing only a small degree of asphericity with a maximum aspheric depth of the same order as the wavelengths of said spectral bandpass, the secondary objective lens element being negatively powered and having a refractive index equal to or lower than the refractive index of the primary objective lens element which is positively powered, the telescope having an internal f-number in the airspace between the primary and secondary objective lens elements of the order of 1.0.

2. An afocal refractor telescope as claimed in claim 1, wherein each of the refractive surfaces of said primary objective lens element is aspheric.

3. An afocal refractor telescope as claimed in claim 1, wherein each aspheric refractive surface conforms to the equation $$ZC = +1 - \sqrt{1 - C(CH^2 + BH^4 + GH^6)}$$

where
Z = distance along the optical axis
C = inverse of the radius of curvature of a spherical datum surface
H = radial distance perpendicular to optical axis
B = first order aspheric coefficient
G = second order aspheric coefficient.

4. An afocal refractor telescope as claimed in claim 1, wherein the secondary objective system lens element has a refractive index equal to or less than the refractive index of each of the other lens element of the telescope.

5. An afocal refractor telescope as claimed in claim 1, wherein the dispersive V-value of the secondary objective system lens element is less than the dispersive V-value of the primary objective system lens element.

6. An afocal refractor telescope as claimed in claim 5, wherein the secondary objective system lens element is mounted for movement along the optical axis.

7. An afocal refractor telescope as claimed in claim 1, wherein the lens elements of said telescope have refractive surface curvatures, separation distances between refractive surfaces (RS) as measured successively from the refractive surface of the eyepiece system furthest from said objective system, and materials as set forth in the following table:

| Item | Surface | Separation Distance (mm) | Radius of Curvature (mm) | Material | Aperture Diameter (mm) |
|---|---|---|---|---|---|
| Eyepiece System | | | | | |
| 1st lens element | 1st RS | 25.34 | −199.20 | Air | 37.61 |
|  | 2nd RS | 4.25 | −66.25 | Ge | 38.41 |
| 2nd lens element | 1st RS | 0.50 | 29.36 | Air | 34.42 |
|  | 2nd RS | 11.94 | 22.88 | Ge | 23.29 |
| Objective System | | | | | |
| Secondary lens element | 1st RS | 82.32 | −300.77 | Air | 72.09 |
|  | 2nd RS | 7.50 | −1799.70 | As/Se/Ge(BS1) | 76.40 |
| Primary lens element | 1st RS | 59.07 | Aspheric | Air | 141.37 |
|  | 2nd RS | 15.71 | −141.40 | Ge | 148.11 | said 1st refractive surface of said primary objective system lens element having an aspheric profile in accordance with the following table:

| Radial Distance Perpendicular to Optical Axis (mm) | Depth of Aspheric Profile (microns) |
|---|---|
| 0.00 | 0.00 |
| 2.83 | −0.03 |
| 5.65 | −0.10 |
| 8.48 | −0.22 |
| 11.31 | −0.39 |
| 14.14 | −0.59 |
| 16.96 | −0.82 |
| 19.79 | −1.07 |
| 22.62 | −1.33 |
| 25.45 | −1.58 |
| 28.27 | −1.83 |

| Radial Distance Perpendicular to Optical Axis (mm) | Depth of Aspheric Profile (microns) |
| --- | --- |
| 31.10 | −2.05 |
| 33.93 | −2.23 |
| 36.76 | −2.36 |
| 39.58 | −2.44 |
| 42.41 | −2.45 |
| 45.24 | −2.39 |
| 48.06 | −2.26 |
| 50.89 | −2.06 |
| 53.72 | −1.79 |
| 56.55 | −1.47 |
| 59.37 | −1.11 |
| 62.20 | −0.75 |
| 65.03 | −0.41 |
| 67.86 | −0.14 |
| 70.68 | 0.00 | where the depth of aspheric profile is the separation distance between points on the aspheric profile and the best fit sphere (which has a radius of curvature of −204.7094 mm) at equal radial distances perpendicular to the optical axis.

8. An afocal refractor telescope as claimed in claim 1, wherein the lens elements of said telescope have refractive surface curvatures, separation distances between refractive surfaces (RS) as measured from the refractive surface of the eyepiece system furthest from said objective system, and materials as set forth in the following table:

| Item | Surface | Separation Distance (mm) | Radius of Curvature (mm) | Material | Aperture Diameter (mm) |
| --- | --- | --- | --- | --- | --- |
| Eyepiece System | | | | | |
| 1st lens element | 1st RS | 19.52 | −199.20 | Air | 32.80 |
| | 2nd RS | 4.18 | −100.08 | Ge | 33.92 |
| 2nd lens element | 1st RS | 8.50 | −476.45 | Air | 36.54 |
| | 2nd RS | 3.75 | −110.89 | Ge | 36.87 |
| 3rd lens element | 1st RS | 0.50 | 30.79 | Air | 33.16 |
| | 2nd RS | 12.77 | 23.01 | Ge | 21.71 |
| Objective System | | | | | |
| Secondary lens element | 1st RS | 74.06 | −286.13 | Air | 66.69 |
| | 2nd RS | 7.50 | −7621.95 | As/Se/Ge(BS1) | 70.97 |
| Primary lens element | 1st RS | 61.95 | Aspheric | Air | 137.91 |
| | 2nd RS | 15.71 | −135.64 | Ge | 144.82 | said 1st refractive surface of said primary objective system lens element having an aspheric profile in accordance with the following table:

| Radial Distance Perpendicular to Optical Axis (mm) | Depth of Aspheric Profile (microns) |
| --- | --- |
| 0.00 | 0.00 |
| 2.76 | −0.01 |
| 5.52 | −0.05 |
| 8.27 | −0.12 |
| 11.03 | −0.20 |
| 13.79 | −0.31 |
| 16.55 | −0.42 |
| 19.31 | −0.54 |
| 22.07 | −0.65 |
| 24.82 | −0.76 |
| 27.58 | −0.85 |
| 30.34 | −0.91 |
| 33.10 | −0.95 |
| 35.86 | −0.95 |
| 38.61 | −0.91 |
| 41.37 | −0.83 |
| 44.13 | −0.72 |
| 46.89 | −0.58 |
| 49.65 | −0.42 |
| 52.41 | −0.27 |
| 55.16 | −0.13 |
| 57.92 | −0.05 |
| 60.68 | −0.07 |
| 63.44 | −0.24 |
| 66.20 | −0.61 |
| 68.95 | −1.26 | where the depth of aspheric profile is the separation distance between points on the aspheric profile and the best fit sphere (which has a radius of curvature of −193.84 mm) at equal radial distances perpendicular to the optical axis.

* * * * *